US006684969B1

(12) United States Patent
Flowers et al.

(10) Patent No.: US 6,684,969 B1
(45) Date of Patent: Feb. 3, 2004

(54) CHANGEABLE PERSONAL MOBILITY VEHICLE

(75) Inventors: Michael J. Flowers, Sewell, NJ (US); Louis A. Madonia, Mullica, NJ (US); Edward J. Hanker, Jr., Mullica Hill, NJ (US); Mark J. Hoskin, Mars Landing, NJ (US); Jan Wilder, Mount Long, NJ (US)

(73) Assignee: Electric Mobility Corporation, Sewell, NJ (US)

( * ) Notice: Subject to any disclaimer, the term of this patent is extended or adjusted under 35 U.S.C. 154(b) by 0 days.

(21) Appl. No.: 10/132,600

(22) Filed: Apr. 25, 2002

Related U.S. Application Data

(60) Provisional application No. 60/286,761, filed on Apr. 26, 2001.

(51) Int. Cl.[7] .................................................. B60K 1/00

(52) U.S. Cl. ...................... 180/65.1; 180/316; 180/330; 180/907

(58) Field of Search ................................ 180/65.1, 315, 180/316, 326, 329, 330, 907, 908, 271, 272; 297/423.26, 217.3

(56) References Cited

U.S. PATENT DOCUMENTS

| | | | | |
|---|---|---|---|---|
| 2,586,273 A | | 2/1952 | Steven | |
| 3,882,949 A | | 5/1975 | Anderson | |
| 4,274,503 A | | 6/1981 | Mackintosh | |
| 4,341,278 A | | 7/1982 | Meyer | |
| 4,730,691 A | * | 3/1988 | Grigg | 180/329 |
| 4,951,766 A | | 8/1990 | Basedow et al. | |
| 4,953,645 A | | 9/1990 | Korber et al. | |
| 5,096,008 A | | 3/1992 | Mankowski | |
| 5,183,133 A | | 2/1993 | Roy et al. | |
| 5,193,633 A | | 3/1993 | Ezenwa | |
| 5,275,248 A | | 1/1994 | Finch et al. | |
| 5,592,997 A | | 1/1997 | Ball | |
| 5,732,788 A | * | 3/1998 | Brown | 180/326 |
| 5,848,658 A | | 12/1998 | Pulver | |
| 5,944,131 A | * | 8/1999 | Schaffner et al. | 180/65.1 |
| 6,073,951 A | | 6/2000 | Jindra et al. | |
| 6,290,011 B1 | * | 9/2001 | Langaker et al. | 180/65.1 |

* cited by examiner

*Primary Examiner*—Brian L. Johnson
*Assistant Examiner*—Brian L Swenson
(74) *Attorney, Agent, or Firm*—Frijouf, Rust & Pyle, P.A.

(57) ABSTRACT

An improved footrest system and an improved electrical switching device are disclosed for a personal mobility vehicle having a rotatable chair. The improved footrest system comprises a first and a second footrest plate pivotably mounted to a first and a second end of the personal mobility vehicle. A first and a second spring resiliently biases the first and a second footrest plate into an inoperative position. Each of the first and second footrest plates is pivotable into an operative position by the feet of an operator for providing a footrest for the operator for a first and a second rotational station of the chair. The improved electrical switching device comprises a first switch for providing a front wheel drive operation and a second switch for providing a rear wheel drive operation. In one embodiment the first and second switches are actuated by the rotation of a chair into the operative position. In another embodiment, the first and second switches are actuated by rotation of the first and second footrest plates into an operative position.

4 Claims, 12 Drawing Sheets

CHANGEABLE PERSONAL MOBILITY VEHICLE

CROSS-REFERENCE TO RELATED APPLICATIONS

This application claims benefit of U.S. Patent Provisional application serial No. 60/286,761 filed Apr. 26, 2001. All subject matter set forth in provisional application serial No. 60/286,761 filed Apr. 26, 2001 is hereby incorporated by reference into the present application as if fully set forth herein.

BACKGROUND OF THE INVENTION

1. Field Of The Invention

This invention relates to personal mobility vehicles and more particularly to an improved footrest and/or an improved footrest system for a personal mobility vehicle and an improved electrical switching device for a personal mobility vehicle for switching between a front wheel drive operation and a rear wheel drive operation.

2. Description of the related Art

The aging population has provided a substantial increase in the use of personal mobility vehicles. Personal mobility vehicles provide persons with partial or total walking disabilities with an increased range and greater flexibility in locomotion. The increased use of personal mobility vehicles has required the development of more technically superior features that enable the personal mobility vehicle to be used in various locations and terrain. Personal mobility vehicles may be classified as either scooters or powered wheel chairs.

Scooter personal mobility vehicles have a pair of powered rear wheels and a steerable front wheel configured in the general appearance of a miniature golf cart. The track of the powered rear wheels of the personal mobility vehicle is generally narrower than a conventional wheelchair.

Power wheelchair personal mobility vehicles have a pair of powered wheels and a pair of idler wheels. In many cases, the pair of idler wheels take the form of caster wheels. The power wheelchairs were designed to be more maneuverable than a conventional wheelchair. Typically, power wheelchairs have a smaller width and a shorter overall length than a convention wheelchair.

The powered wheels of a power wheelchair are individually powered for steering the power wheelchair. The individual powered wheels provide a tight turning radius for the power wheelchair. The power wheelchair can either be a front wheel drive or a rear wheel drive power wheelchair. A front wheel drive power wheelchair is generally more maneuverable than a rear wheel drive powered wheel chair. In addition, the front wheel drive power wheelchair has more traction and accommodates larger obstacles such as larger curbs and larger bumps than a rear wheel drive power wheelchair. In contrast, the rear wheel drive powered wheel chair has better high speed stability than a front wheel drive power wheelchair. Accordingly, the front wheel drive power wheelchair is generally more suitable for indoor use whereas the rear wheel drive power wheelchair is generally more suitable for outdoor use.

Some in the prior art have provided a power wheelchair than can be converted between a front wheel drive and a rear wheel drive power wheelchair. The power wheelchair could be converted into a front wheel drive for indoor use and could be converted into a rear wheel drive for outdoor use. The following U.S. Patents are representative of front wheel drive and rear wheel drive power wheelchairs.

In order to operate either as a front wheel drive wheelchair or rear wheel drive wheelchair, the electrical control must be modified to accommodate for the different forward and reverse direction of the electric motors when the rear wheel drive powered wheelchair is transformed into a front wheel drive wheelchair. The following U.S. Patents disclose an apparatus for switching the power supply for accommodating either a front or rear wheel drive powered wheelchair.

U.S. Pat. No. 2,586,273 to Steven discloses a hospital chair having wheels and electric motors for driving the wheels by electric switches for supplying operating current to the motors. A manually operable lever having a neutral or inoperative position is carried by the chair and operable by movement away from its neutral position to close the switches to operate the motors. Mechanical brakes are normally applied to the motors by spring pressure. An electrical means independent from the motor circuit is provided to release the brakes. A lever is operable during its initial movement to actuate the last named electrical means to release the brakes before the motors are started.

U.S. Pat. No. 3,882,949 to Anderson discloses a universal, adjustable-height powered wheelchair for the severely disabled, such as a quadriplegic driver. The wheelchair has a powered elevating mechanism capable of raising the seat and occupant from a height of 6 inches to 26 inches above the ground. It is capable of climbing a 12-inch high curb and may be used while driving any standard-sized two-door sedan.

U.S. Pat. No. 4,274,503 to Mackintosh discloses a wheelchair assembly including an occupant seat having a central shaft for mounting the seat on an undercarriage for universal tilting movement, for vertical movement along the shaft axis and for rotation about such axis. The undercarriage has a plurality of ground engaging wheels driven together by a driving mechanism which includes a drive motor and steered together by a steering mechanism which includes a steering motor. The steering motor may be operatively connected with both the seat and the wheels for turning them together by operation of a control assembly, or the steering motor may be operatively connected with only the seat or with only the wheels for independent operation. Otherwise, the steering mechanism may couple the seat with the wheels while the steering motor is disconnected so that wheel steering may be operated by a manual turning of the seat. An analyzer assembly compares the direction of travel chosen by the seat occupant to the actual orientation of the wheels and then directs the steering motor to align the wheels to the direction chosen, without turning the chair. The seat is automatically tilted toward a direction opposite that to which, it tends to lean when the wheelchair moves up an incline or down a decline.

U.S. Pat. No. 4,341,278 to Meyer discloses an electrically driven wheelchair having steerable rear wheels controllable by means of a joystick control operating an electromechanical steering mechanism including a control circuit. The electrical control circuit includes a voltage divider which receives a voltage determined according to the travelling speed of the wheelchair to enable the turning circle of the steering mechanism to be adjusted in relation to the travelling speed, so that at high speeds a large turning circle only is available while at low speeds a small turning circle is allowed, thereby minimizing the possibility of tipping the wheelchair over by turning too sharply at high speed.

U.S. Pat. No. 4,951,766 to Basedow discloses, wheelchairs having large diameter drive wheels and small diameter steerable wheels. Wheel-chairs for indoor operation have drive wheels as their rear wheels, while wheel-chairs for outdoor operation have their drive wheels as front wheels. In the wheel chair according to the invention, the seat assembly is mounted for rotation about a vertical axis by means of a supporting column above the chassis, such that, depending on the purpose of use of the wheel-chair, the large drive wheels are selectively disposed in the front or rear position with respect to the seating direction. In this way, the wheel chair may be used both indoors and outdoors in an optimum manner. Additional positioning alternatives of the seat assembly relative to the chassis, open to the user new possibilities of utilization. By an automatic switchover of the control or steering lever in accordance with the position of the seat assembly, optimum operation of the wheel chair is obtained.

U.S. Pat. No. 4,953,645 to Korber discloses an electric wheelchair comprising drive wheels on one axle group, and swivel wheels on a second axle group, with the swivel wheels being either freely pivotable or positively steerable by an engageable steering drive. The positive steering system may have either a purely electric configuration in the form of a pair of electric steering drives, or an electro-mechanical configuration in the form of a common steering drive and a mechanical steering mechanism with electro-mechanical disengagement of the positive steering system. Switch-over from pivoting to steering operation is monitored by position sensors provided on the swivel wheels. As the seat assembly is adapted to be rotated to a corresponding position, the swivel wheels may be operated alternatively as the front wheels or the rear wheels of the wheel chair. Owing to the engageable steering drive, the wheel-chair is well adapted for both indoor operation and outdoor operation, thereby considerably enhancing the mobility of a disabled person.

U.S. Pat. No. 5,096,008 to Mankowski discloses a rotatable stand-up wheelchair or invalid mobility device which includes a main drive chassis having front and rear wheels. A means for raising and lowering the seat and back portion of the wheelchair raises and lowers the invalid from a substantially seated position on the seat to a substantially standing position supported by a foot plate attached to the base of the wheelchair. Stability of the wheelchair device is maintained by two triangular wheel configurations intercepting at their apex. In operation, the invalid can move while standing in such a fashion as the foot plate may be lowered to a close proximity to the ground so that the invalids hand approximates the level of a hand height of a non-handicapped person. This simulated normal motion and enables direct contact with countertops and other work surfaces.

U.S. Pat. No. 5,183,133 to Roy discloses a motorized wheel assembly in which there is a seat for receiving the occupant attached to a vertical shaft with a single central wheel mounted at the bottom of the shaft for rotation about a horizontal axis transverse to the chair and defining a direction of forward movement of the wheel forwardly of the chair. On the chair and the shaft, a battery and control unit is carried for supplying power to the drive motor of the wheel mounted on the hub of the wheel. An outrigger frame includes a sleeve slidable on the shaft and a plurality of arms extending outwardly from the sleeve. Each arm carries a castor wheel to prevent toppling of the device. Steering is achieved by the feet of the user applied to the outrigger frame to rotate the chair and the drivewheel about a vertical axis. The motor in a hub design of the wheel is achieved by providing a cylindrical housing surrounding the motor with annular bearings on the outer peripheral surface of the housing carrying the rim of the wheel which directly surrounds the housing. An output shaft at one end of the housing drives the rim through a coupling extending around the housing.

U.S. Pat. No. 5,193,633 to Ezenwa discloses a powered transfer and transport system to permit disabled individuals increased mobility and freedom of movement. The powered system performs as a wheelchair in one configuration and as a bed in another, and provides powered mechanisms for variously positioning the seating surface which are operable by the occupant from the seating surface. The powered system includes mechanisms for laterally shifting, elevating, rotating, reclining and driving the seating surface. Enhanced mobility and freedom of movement for the individual results, improving the capability for independent living and expanding employment opportunities.

U.S. Pat. No. 5,275,248 to Finch et al discloses a power-driven and steered wheelchair comprising a pair of ground-engaging wheels mounted in laterally-spaced relationship to a frame carrying a seat for an occupant and supporting the power source and a transaxle transmission for imparting both driving and steering power to the ground-engaging wheels. Steering is accomplished by employing separate planetary drive mechanisms for each of the primary ground-engaging wheels and imparting rotation in opposite directions to the ring gears of such planetary drive mechanisms to effect the rotation of one wheel at a greater speed than the other wheel in either a forward or rearward direction, thus producing power steering of the wheelchair.

U.S. Pat. No. 5,592,997 to Ball discloses a wheelchair basically designed for mobility impaired children ages 2–6. The wheelchair is especially designed to facilitate the child's access to all objects and activities that would normally be available to a non-disabled child. The chair includes a power base, including large front drive wheels and small rear casters, and a seat that is positioned directly over the drive wheels and that is readily detachable from the base. All components of the wheelchair are positioned inboard of the side edges of the seat and inboard of the front edge of the seat so as to maximize access to areas alongside of and in front of the wheelchair. The axis of rotation of the front drive wheels is generally vertically aligned with the trunk of the child positioned in the seat and the composite center of gravity of the child and wheelchair is positioned slightly behind the axis of rotation of the drive wheels so that the child can tilt the wheelchair forwardly about the axis of the front drive wheels by a simple forward rotation of the child's trunk. The wheelchair also includes a stowable footrest that readily retracts into the base of the wheelchair.

U.S. Pat. No. 5,848,658 to Pulver discloses a mid-wheel drive or front wheel drive power wheelchair including a front stabilizer extending from the frame. A first arm is pivotally mounted to the frame at a first or upper end and a stabilizer wheel is mounted adjacent a second end. A second arm of the stabilizer assembly is pivotally connected at opposite ends to the stabilizer wheel axis and lower end of the shock assembly associated with the suspension arm. The first arm includes a dampening cylinder surrounded by a spring. The spring force preload can be selectively altered and, independently, the height of the stabilizer wheel may be adjusted.

U.S. Pat. No. 6,073,951 to Jindra discloses a wheelchair including a rigid upholstered seat removably mounted on a crossbrace-type chassis. The seat includes a generally square-shaped frame having a clevis assembly depending from each of the four corners of the frame. Each one of a first pair of the clevis assemblies disposed at diagonally opposed front and rear corners of the seat frame is formed with aligned generally pear-shaped openings. Each one of a second pair of the clevis assemblies disposed at the other diagonally opposed front and rear corners of the seat frame is formed with aligned generally horizontal elliptical-shaped openings. An inverted generally U-shaped mounting bracket formed with aligned openings is disposed on each end of each one of a pair of chassis sideframes. Each clevis assembly is engageable with a respective one of the U-shaped brackets so that the respective openings of the engaged brackets are aligned. A quick release pin is passed through each set of aligned openings to secure the seat to the chassis. The pear-shaped openings allow vertical articulation of the chassis relative to the seat in certain instances when a bump, depression or other irregularity on a travel surface is encountered by usually one of the wheels of the wheelchair. This articulation enables the wheelchair to insulate its occupant from shocks caused by such irregularities, and also maintains all wheels of the wheelchair in continuous contact with the travel surface to preserve occupant steering control and stability of the wheelchair.

Although the aforementioned patents have contributed substantially to the powered wheelchair art, it is an object of the present invention to improve upon the aforementioned patents and to provide a significant advancement to the powered wheelchair art.

Therefore, it is an object of the present invention to provide an improved footrest system and an improved electrical switching device for a personal mobility vehicle Another object of this invention is to provide an improved footrest system that automatically retracts upon nonuse of the power wheelchair.

Another object of the present invention is to provide an improved footrest system for a personal mobility vehicle that provides dual footrests for use as a front wheel drive power wheelchair or for use as a rear wheel drive power wheelchair.

Another object of this invention is to provide an improved electrical switching device for a personal mobility vehicle for switching between a front wheel drive operation and a rear wheel drive operation.

Another object of this invention is to provide an improved electrical switching device for a personal mobility vehicle which automatically switches from a front wheel drive operation to a rear wheel drive operation upon rotation of the powered wheelchair seat.

Another object of this invention is to provide an improved electrical switching device for a personal mobility vehicle that automatically switches from a front wheel drive operation to a rear wheel drive operation upon depression of a footrest.

Another object of this invention is to provide an improved electrical switching device for a personal mobility vehicle which automatically switches the power supply from a front wheel drive operation to a rear wheel drive operation that inhibits operation of the personal mobility vehicle during transition between a front wheel drive operation to a rear wheel drive operation.

Another object of this invention is to provide an improved electrical switching device for a personal mobility vehicle that is incapable of operation unless the seat is properly positioned into either the front wheel drive position or the rear wheel drive position.

Another object of this invention is to provide an improved electrical switching device for a personal mobility vehicle that can accommodate a removable seat without electrical disconnection.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

The present invention is defined by the appended claims with specific embodiments being shown in the attached drawings. For the purpose of summarizing the invention, the invention relates to an improved footrest system and an improved electrical switching device for a personal mobility vehicle.

The improved footrest system is adapted for use with a personal mobility vehicle having a chair being rotatable between a first and a second rotational station. The improved footrest system comprises a first and a second footrest plate mounted to the personal mobility vehicle with each of the first and second footrest plates being biased into an inoperative position. The first and second footrest plates are movable into an operative position by the feet of an operator for providing a footrest for the operator for each of the first and second rotational stations of the chair.

In a more specific example of the invention, the first and second footrest plates are biased into an inoperative position comprises a first and a second spring resiliently pivoting the first and second footrest plates into the inoperative generally vertical position. The first and second footrest plates are pivotable into a generally horizontal position. Preferably, a first and a second adjustable stop adjust the orientation of the operative position of the first and second footrest plates.

The improved electrical switching device is adapted for use with a personal mobility vehicle for switching between a front wheel drive operation and a rear wheel drive operation. The improved electrical switching device comprises a frame having a pair of driving wheels mounted to the frame. A pair of idler wheels are mounted to the frame. A first and second switch is connected to a power source. The first switch is actuated for energizing the control for a front wheel drive operation. The second switch is actuated for energizing the control for a rear wheel drive operation. The first and second switches are actuated by a rotation of a component of the personal mobility vehicle.

In one example of the invention, a chair is rotatably mounted to the personal mobility vehicle. The first switch is actuated when the seat is rotated into a position with the drive wheels being in front of the seat for energizing the control for a front wheel drive operation. The second switch is actuated when the seat is rotated into a position with the drive wheels being behind the seat for energizing the control for a rear wheel drive operation.

In another example of the invention, a first and a second footrest is pivotably mounted to the personal mobility vehicle. The first switch is actuated when the first footrest is pivoted into an operative position for energizing the control for a front wheel drive operation. The second switch is actuated when the second footrest is pivoted into an operative position for energizing the control for a rear wheel drive operation.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

DETAILED DISCUSSION

Figure 2:
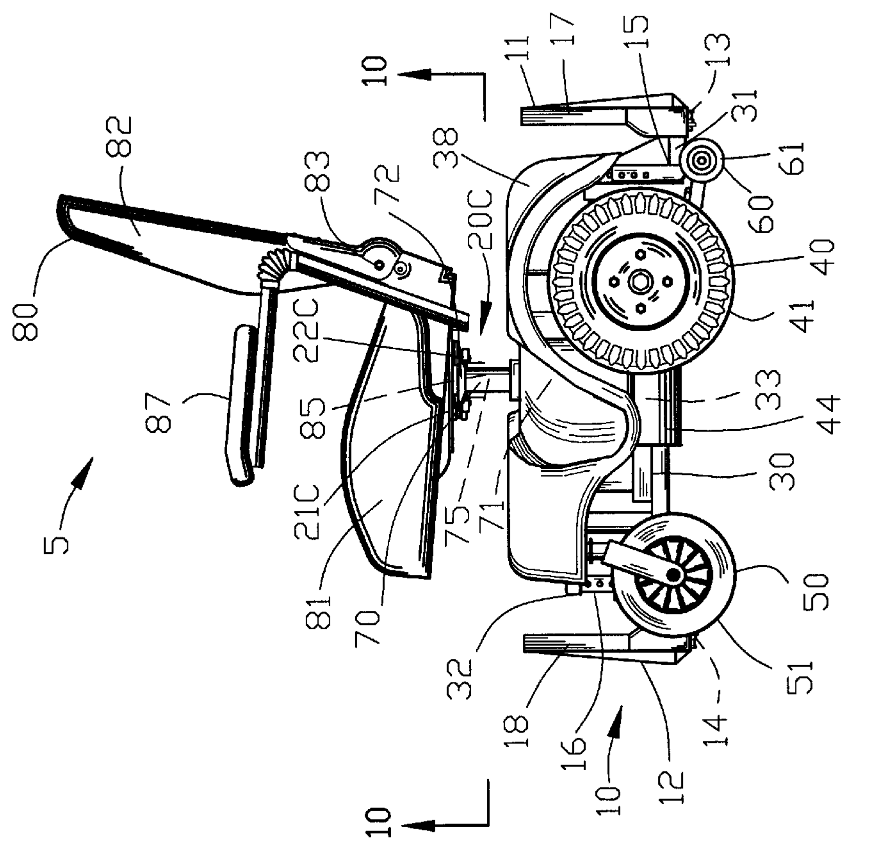
FIG. 2 is a side view of the power wheelchair of FIG. 1 with the rotatable chair being located in a second station forming a rear wheel drive power chair and with the rotatable chair switching the electrical switching device into a rear wheel drive operation.
Figure 1:
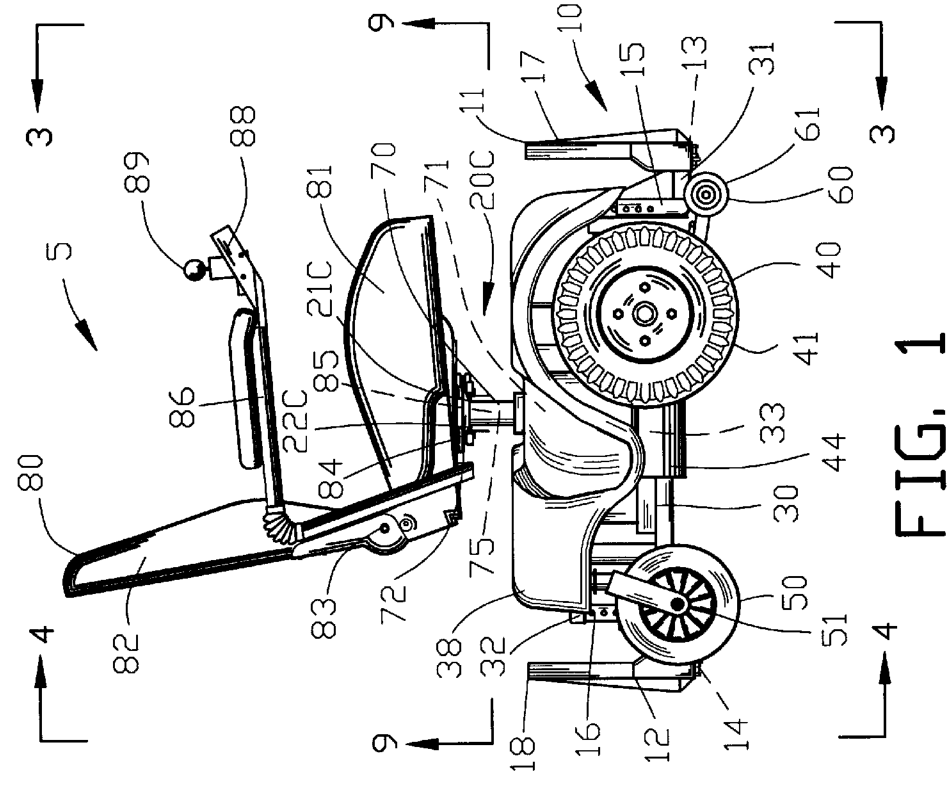
FIG. 1 is a side view of a power wheelchair incorporating the improved footrest system of the present invention and a first embodiment of the improved electrical switching device of the present invention with a rotatable chair being located in a first station forming a front wheel drive power chair and with the rotatable chair switching the electrical switching device into a front wheel drive operation.

FIGS. 1 and 2 are side views of a personal mobility vehicle 5 shown as a power wheelchair incorporating an improved footrest system 10 and an improved electrical switching device 20 of the present invention. The improved footrest system 10 may be used individually or in combination with the improved electrical switching device 20. The improved footrest system 10 mechanically changes the personal mobility vehicle 5 between a front wheel drive operation as shown in FIG. 1 and a rear wheel drive operation as shown in FIG. 2. The improved electrical switching device 20 electrically changes the personal mobility vehicle 5 between a front wheel drive operation as shown in FIG. 1 and a rear wheel drive operation as shown in FIG. 2.

The improved footrest system 10 includes a first and a second footrest assembly 11 and 12. The first footrest assembly 11 comprises a first spring 13 supported by a first footrest base 15 for biasing a first footrest plate 17 into the inoperative position relative to the personal mobility vehicle 5 as shown in FIGS. 1 and 2. The second footrest assembly 12 comprises a second spring 14 supported by a second footrest base 16 biasing a second footrest plate 18 into the inoperative position relative to the personal mobility vehicle 5 as shown in FIGS. 1 and 2. When the first and second footrest plates 17 and 18 are located in the inoperative position, the first and second footrest plates 17 and 18 are disposed in a generally vertical position.

The improved electrical switching device switches the personal mobility vehicle 5 between a front wheel drive operation as shown in FIG. 1 and a rear wheel drive operation as shown in FIG. 2. As will be described in greater detail hereafter, the improved electrical switching device cooperates with rotational components of the power wheelchair 5 switching between the front wheel drive operation and the rear wheel drive operation.

Figure 4:
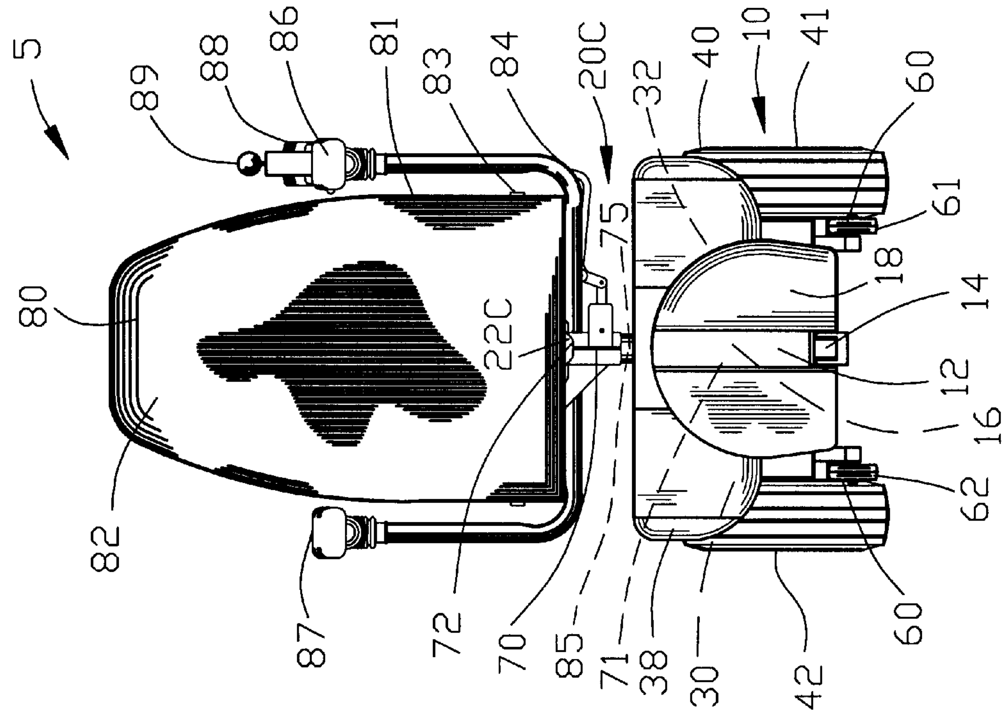
FIG. 4 is a view along line 4—4 in FIG. 1.
Figure 3:
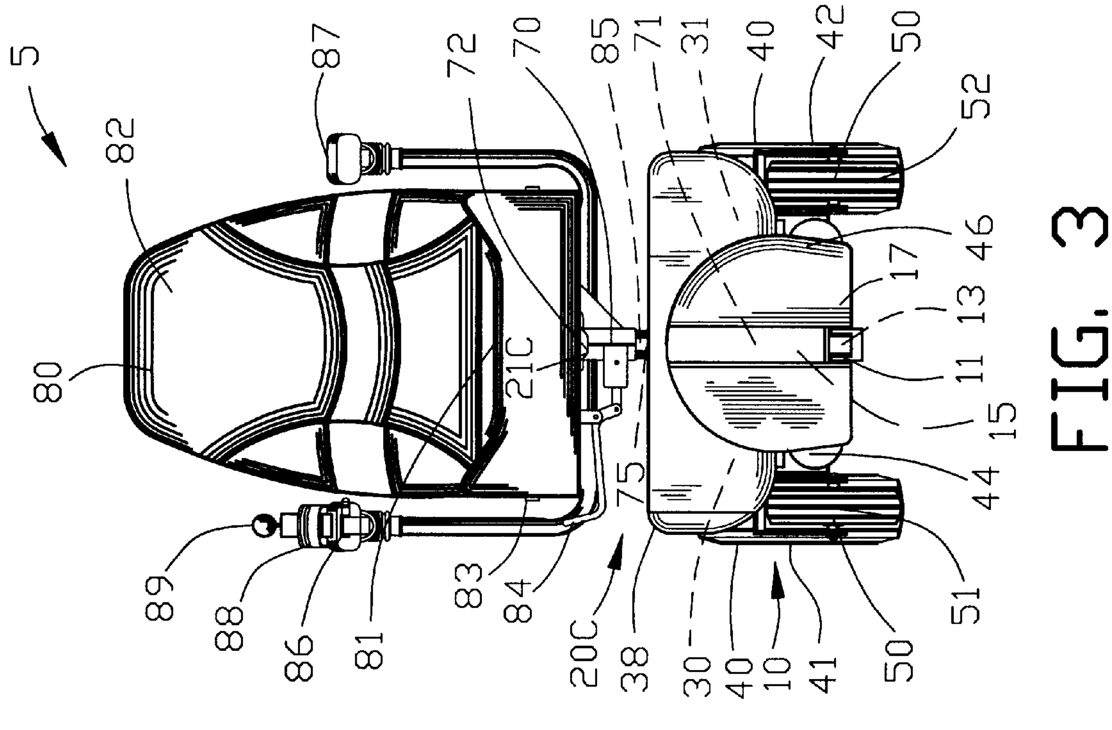
FIG. 3 is a view along line 3—3 in FIG. 1.

FIGS. 3 and 4 are further views along line 3—3 and 4—4 in FIG. 1. The power wheelchair 5 comprises a frame 30 extending between a first frame portion 31, a second frame portion 32 and an intermediate frame portion 33. The frame 30 of the power wheelchair 5 is covered by a covering 38 for overlaying interior portions of the power wheelchair 5 and for enhancing the attractiveness of the power wheelchair 5.

The power wheelchair 5 comprises a drive wheel assembly 40 located in proximity to the intermediate frame portion 33 of the frame 30. The drive wheel assembly 40 comprises a right and a left drive wheel 41 and 42. The right and left drive wheels 41 and 42 are driven by the right and left drive motors 44 and 46.

An idler wheel assembly 50 is located in proximity to the second frame portion 32 of the frame 30. The idler wheel assembly 50 comprises a right and a left idler wheel 51 and 52. The right and left idler wheels 51 and 52 are shown as right and left caster wheels mounted by swivels (not shown) to the second frame end 32 of the frame 30.

A stabilizing wheel assembly 60 is located in proximity to the first frame portion 31 of the frame 30. The stabilizing wheel assembly 60 comprises a right and a left stabilizing wheel 61 and 62. The right and left stabilizing wheel 61 and 62 are secured to the first frame end 31 of the frame 30.

A pedestal 70 extends between a lower end 71 and an upper end 72 in a substantially vertical orientation. The lower end 71 of the pedestal 70 is secured to the intermediate frame portion 33 of the frame 30. An upper end 72 of the pedestal 70 extends upwardly for supporting a chair assembly 80. The upper end 72 of the pedestal 70 defines an internal aperture 75 within the pedestal 70.

The chair assembly 80 comprises a chair portion 81 and a backrest portion 82. In this example, the backrest portion 82 is pivotally mounted to the chair portion 81 by a pivot 83 for accommodating for the size and comfort of an operator.

The chair assembly 80 is rotatably mounted on the pedestal 70 with the rotation of the chair assembly 80 being controlled by a lever 84. The chair assembly 80 includes a rotation shaft 85 receivable within the internal aperture 75 of the pedestal 70 for rotatably mounting chair assembly 80 on the pedestal 70.

Plural armrests 86 and 87 are secured to the chair portion 81 of the chair assembly 80. One of the plural armrests 86 and 87 supports a control console 88 having a joystick 89. The control console 88 controls the operation of the right and left drive motors 44 and 46. An operator controls the speed and direction of the power wheelchair 5 through the joystick 89 actuating the right and left drive motors 44 and 46.

The rotation of the chair assembly 80 converts the power wheelchair 5 from a front wheel drive power wheelchair 5 shown in FIG. 1 to a rear wheel drive power wheelchair 5 shown in FIG. 2. In addition, the rotation of the chair assembly 80 facilitates the ingress and egress of an operator from the power wheelchair 5.

The first embodiment of the improved electrical switching device 20C of the present invention includes a first switch 21C and a second switch 22C for switching between the front wheel drive operation and the rear wheel drive operation. In this first embodiment of improved electrical switching device 20C, the first and second switches 21C and 22C cooperate with the rotatable chair assembly 80 for switching between the front wheel drive operation and the rear wheel drive operation upon the rotation of the rotatable chair assembly 80.

FIG. 1 illustrates the power wheelchair 5 with the chair assembly 80 being rotated on the pedestal 70 to provide a front wheel drive power wheelchair 5. The rotation of the chair assembly 80 actuates the first switch 21C for switching the power wheelchair 5 into the front wheel drive operation. The first and second footrest assemblies 11 and 12 are shown in an inoperative position.

FIG. 2 illustrates the power wheelchair 5 with the chair assembly 80 being rotated on the pedestal 70 to provide a rear wheel drive power wheelchair 5. The rotation of the chair assembly 80 actuates the second switch 22C for switching the power wheelchair 5 into the rear wheel drive operation. The first and second footrest assemblies 11 and 12 are shown in an inoperative position.

Figure 6:
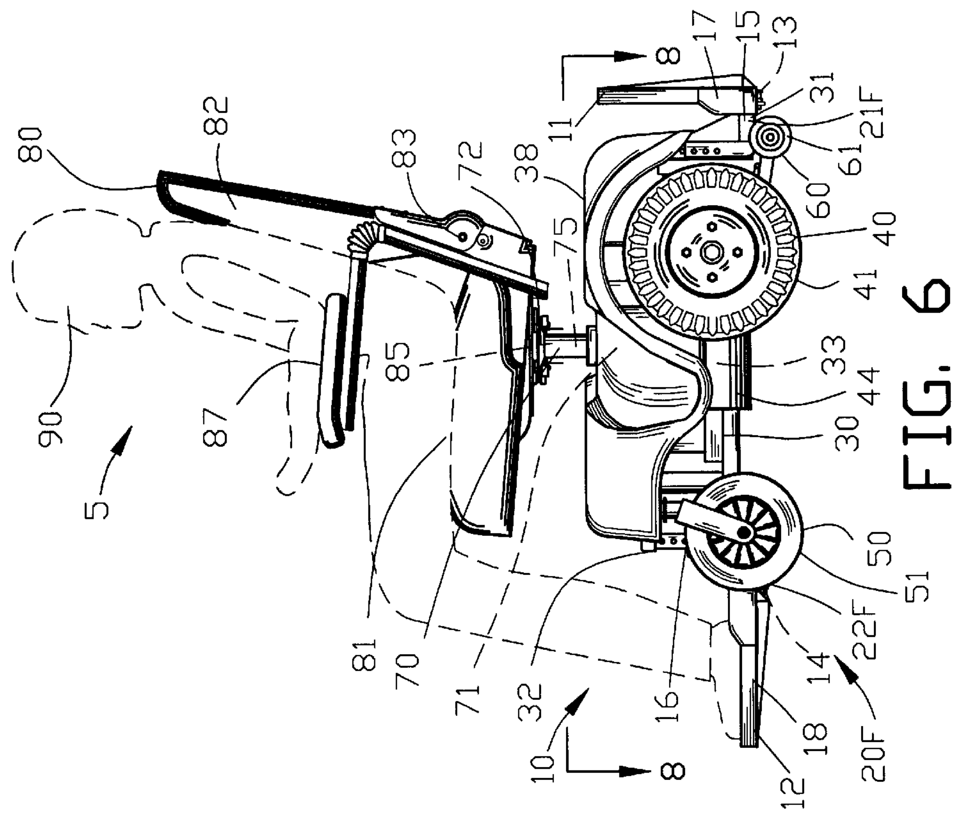
FIG. 6 is a side view of the power wheelchair of FIG. 5 with the operator located in the chair and with the second footrest plate being in an operative position for switching the electrical switching device into a rear wheel drive operation and with the first footrest plate being in an inoperative position.
Figure 5:
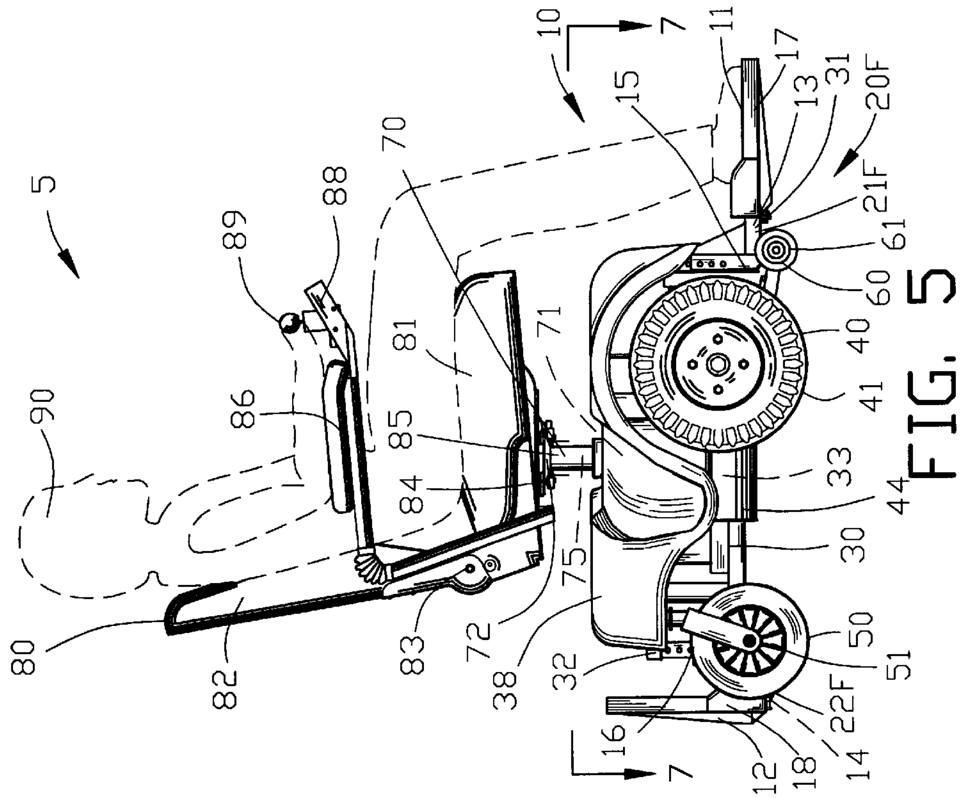
FIG. 5 is a side view of the power wheelchair of FIG. 1 incorporating the improved footrest system of the present invention and a second embodiment of the improved electrical switching device of the present invention with an operator located in the rotatable chair and with a first footrest plate being in an operative position for switching the electrical switching device into a front wheel drive operation and with a second footrest plate being in an inoperative position.

FIGS. 5 and 6 are side views of the power wheelchair of FIGS. 1 and 2 incorporating a second embodiment of the improved electrical switching device 20F for switching between the front wheel drive operation as shown in FIG. 5 and the rear wheel drive operation as shown in FIG. 6.

Figure 7:
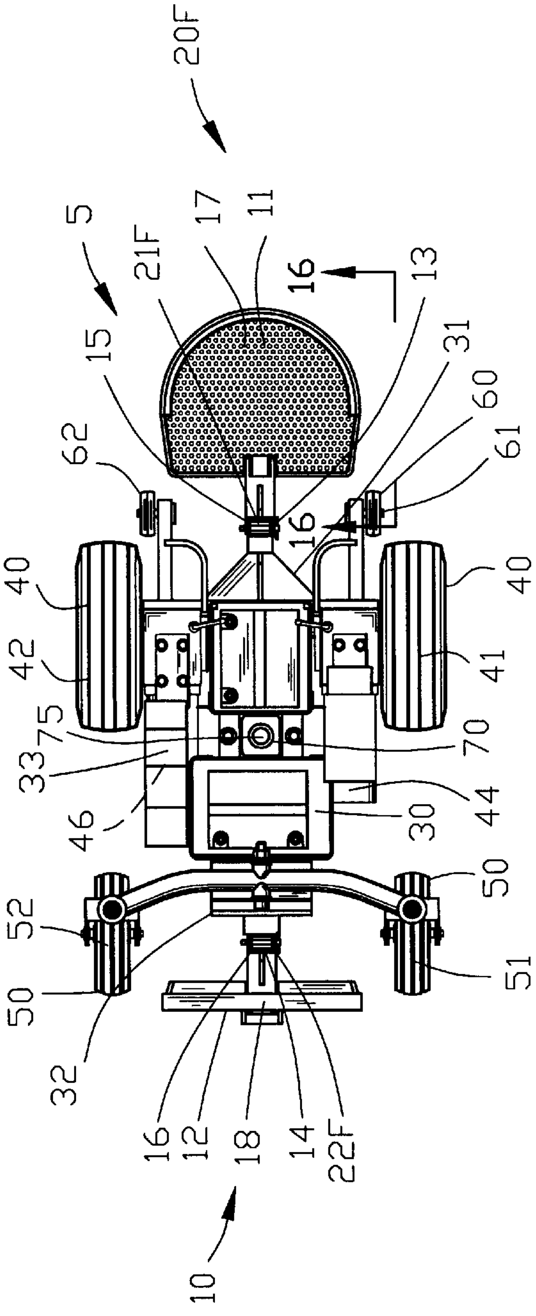
FIG. 7 is a sectional view along line 7—7 in FIG. 5.
Figure 8:
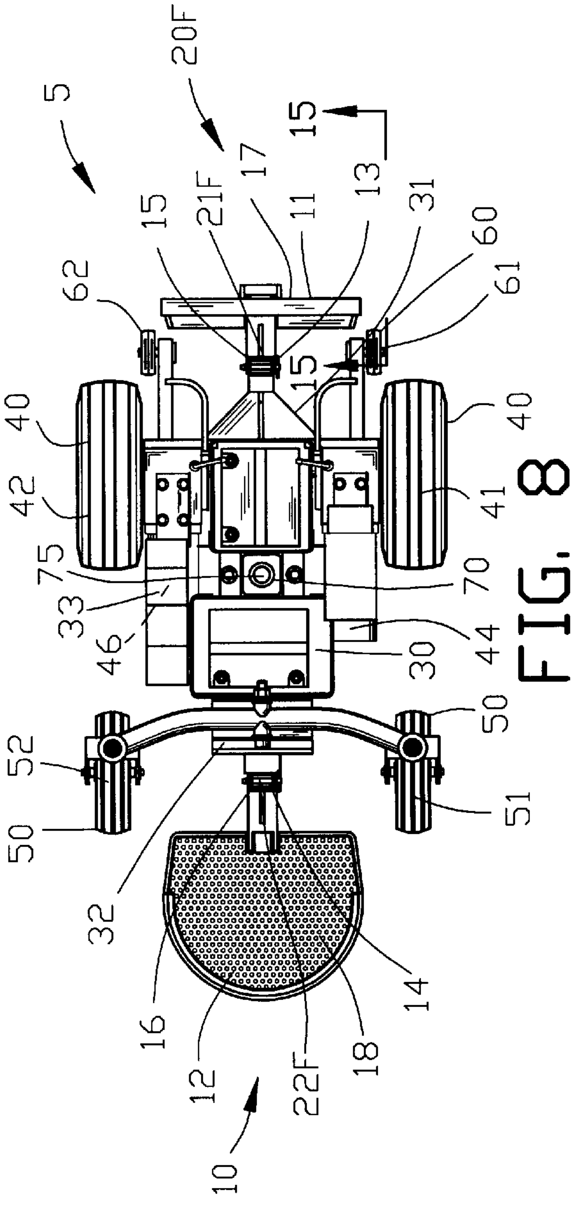
FIG. 8 is a sectional view along line 8—8 in FIG. 6.

FIGS. 7 and 8 are sectional views of the power wheelchair of FIGS. 5 and 6. In this second embodiment of improved electrical switching device 20F, the first and second switches 21F and 22F cooperate with the first and second footrest assemblies 11 and 12 for switching between the front wheel drive operation as shown in FIG. 5 and the rear wheel drive operation as shown in FIG. 6 upon the rotation of the respective one of the first and second footrest assemblies 11 and 12.

FIG. 5 illustrates the power wheelchair 5 with the chair assembly 80 being rotated on the pedestal 70 to provide a front wheel drive power wheelchair 5. An operator 90 located in the chair assembly 80 rotates the first footplate 17 of the first footrest assembly 11 into the operative position. The rotational movement of the first footplate 17 actuates the first switch 21F for switching the power wheelchair 5 into the front wheel drive operation. The second footrest assembly 12 is shown in an inoperative position.

FIG. 6 illustrates the power wheelchair 5 with the chair assembly 80 being rotated on the pedestal 70 to provide a rear wheel drive power wheelchair 5. The operator 90 located in the chair assembly 80 rotates the second footplate 18 of the second footrest assembly 12 into the operative position. The rotational movement of the second footplate 18 actuates the second switch 22F for switching the power wheelchair 5 into the rear wheel drive operation. The first footrest assembly 11 is shown in an inoperative position.

Figure 10:
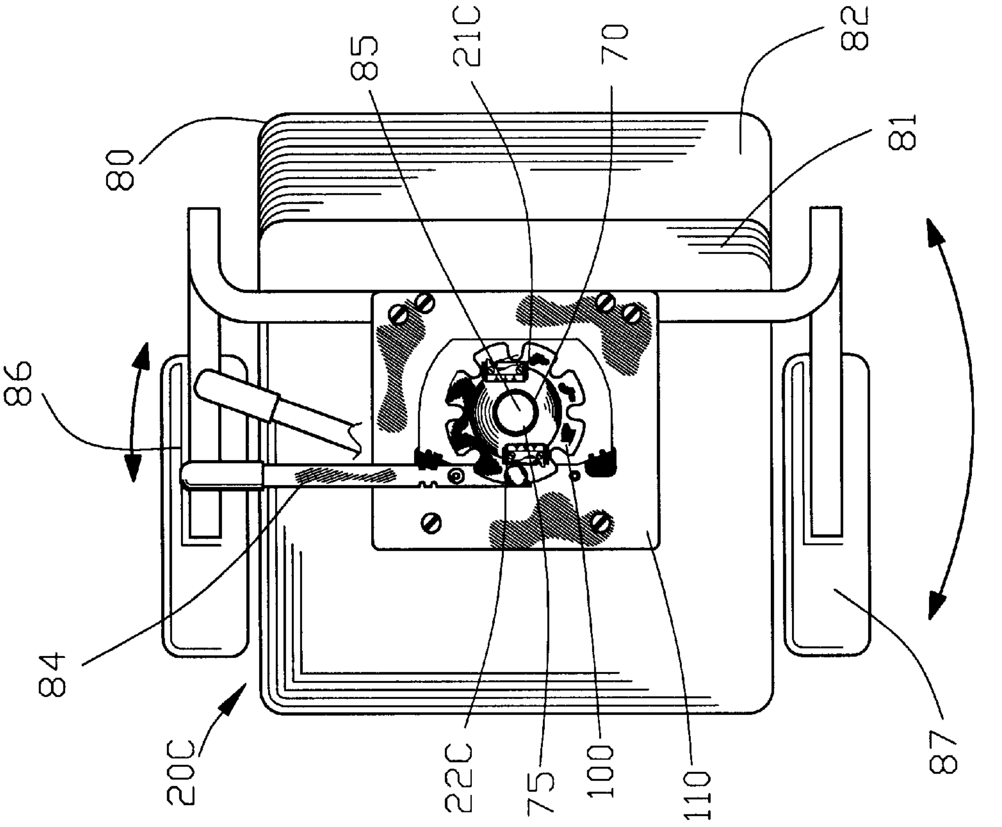
FIG. 10 is an enlarged sectional view along line 10—10 in FIG. 2.
Figure 9:
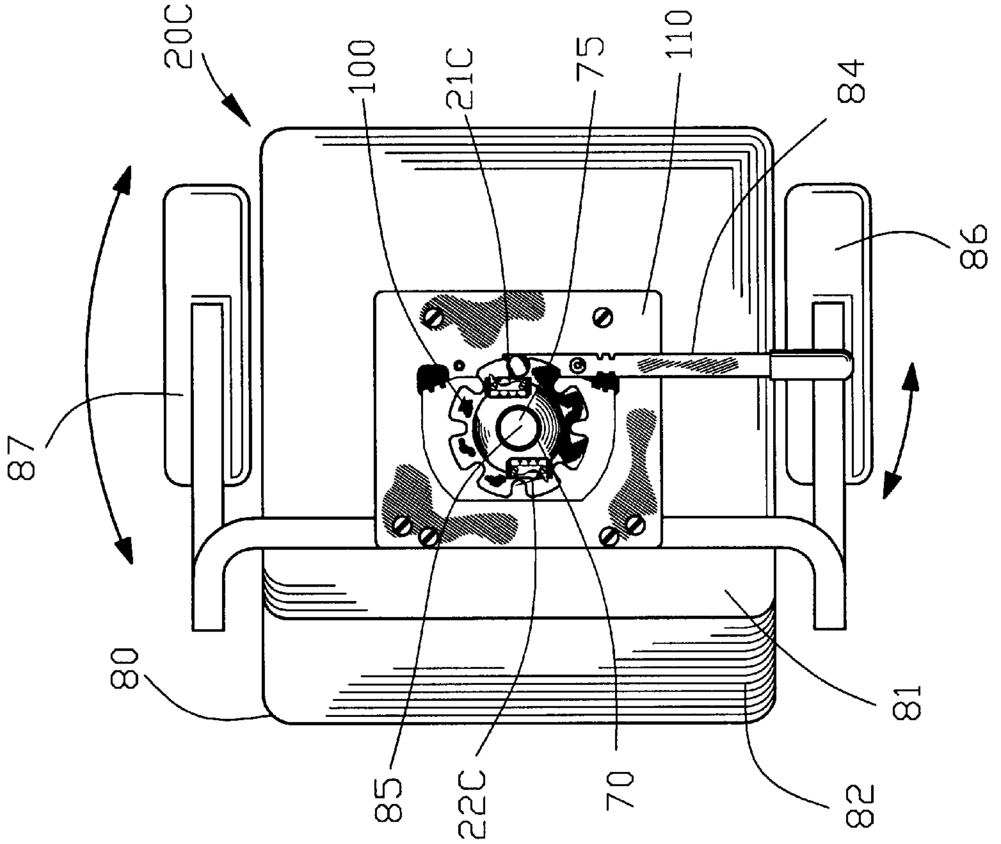
FIG. 9 is an enlarged sectional view along line 9—9 in FIG. 1.

FIGS. 9 and 10 are bottom views of FIGS. 1 and 2 illustrating the chair assembly 80. A metallic flange 100 is secured to the upper end 72 of the pedestal 70. As will be described in greater detail hereinafter, the flange 100 cooperates with the lever 84 for adjustably locking the rotational position of the chair assembly 80 relative to the frame 30 of the power wheelchair 5. The operation of a rotational chair assembly 80 suitable for use with the present invention is more fully set forth in U.S. Pat. No. 6,361,111 which is incorporated by reference into the present application.

FIG. 9 illustrates the chair portion 81 of the chair assembly 80 being rotated to provide a front wheel drive power wheelchair 5. FIG. 10 illustrates the chair portion 81 of the chair assembly 80 being rotated to provide a rear wheel drive power wheelchair 5.

Figure 11:
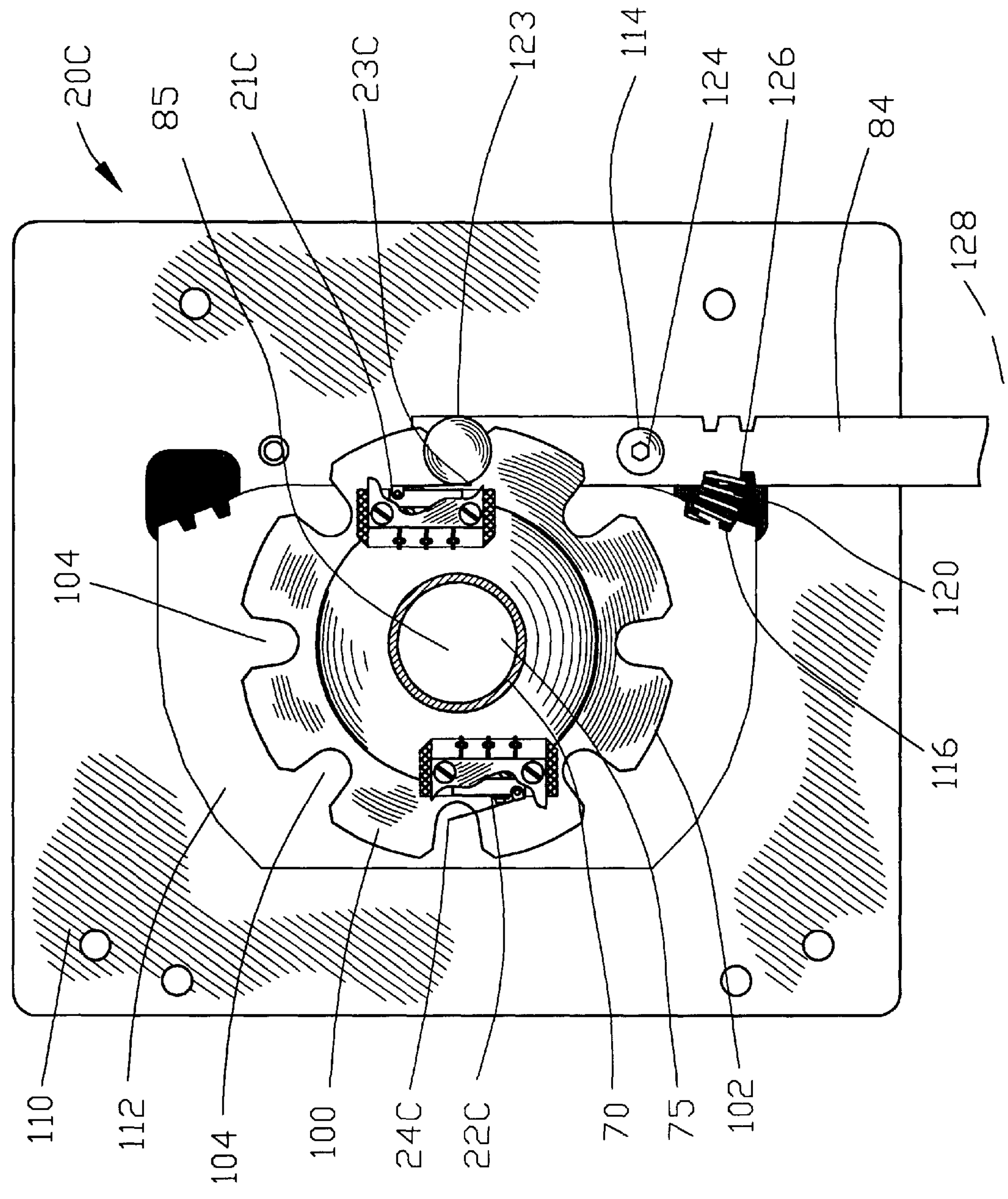
FIG. 11 is an enlarged view of FIG. 9.

FIG. 11 is an enlarged view of FIG. 9 illustrating the flange 100 being substantially circular for defining an outer circumference 102. A plurality of notches 104 are defined in a spaced apart relationship about the outer circumference 102 of the flange 100. The plurality of notches 104 extend radially inwardly from the outer circumference 102 of the substantially circular flange 100.

A seat base 110 is secured to the chair portion 81 of the chair assembly 80. The rotation shaft 85 of the chair assembly 80 extends from the seat base 110 to be received within the internal aperture 75 of the pedestal 70. The rotation shaft 85 received within the internal aperture 75 to rotatably secure the chair portion 81 of the chair assembly 80 to the pedestal 70. The seat base 110 includes a bearing plate 112 for forming a rotational bearing with the flange 100. The bearing plate 112 facilitates rotation of the seat assembly 80 relative to the pedestal 70. The seat base 110 includes a pivot pin 114 for pivoting the lever 84 relative to the seat base 110. The bearing plate 112 defines a respite 116 for receiving one end of a spring 120.

The lever 84 supports a notch pin 123 on one side of a lever pivot 124. The lever pivot 124 cooperates with the pivot pin 114 for pivotably mounting the lever 84 relative to the seat base 110. The lever 84 includes a lever respite 126 adapted for receiving the other end of the spring 120. A handle portion 128 is located an opposed end of the lever 84 from the notch pin 123.

The notch pin 123 is received by one of the plurality of notches 104 for locking the rotational position of the seat base 110 relative to the pedestal 70. The notch pin 123 is received within one of the plurality of notches 104 for positively locking the notch pin 123 within the notch 104. The spring 120 urges the notch pin 123 into engagement with a selected one of the plurality of notches 104.

The notch pin 123 and/or the lever 84 cooperates with the first and second switches 21C and 22C for switching between the front wheel drive operation as shown in FIGS. 1 and 9 and the rear wheel drive operation as shown in FIGS. 2 and 10. The first embodiment of the improved electrical switching device 20C of the present invention electrically switches the front wheel drive operation and the rear wheel drive operation upon the rotation of the rotatable chair assembly 80.

FIG. 11 illustrates the seat assembly 80 being disposed within the first rotational station and with the operating lever 84 being located in a locked position for inhibiting rotation of the seat assembly 80. The spring 120 urges the notch pin 123 into engagement with a first switch actuator 23C for actuating the first switch 21C. The actuation of the first switch actuator 23C electrically switches the power wheelchair 5 into the front wheel drive operation as shown in FIG. 1.

Figure 12:
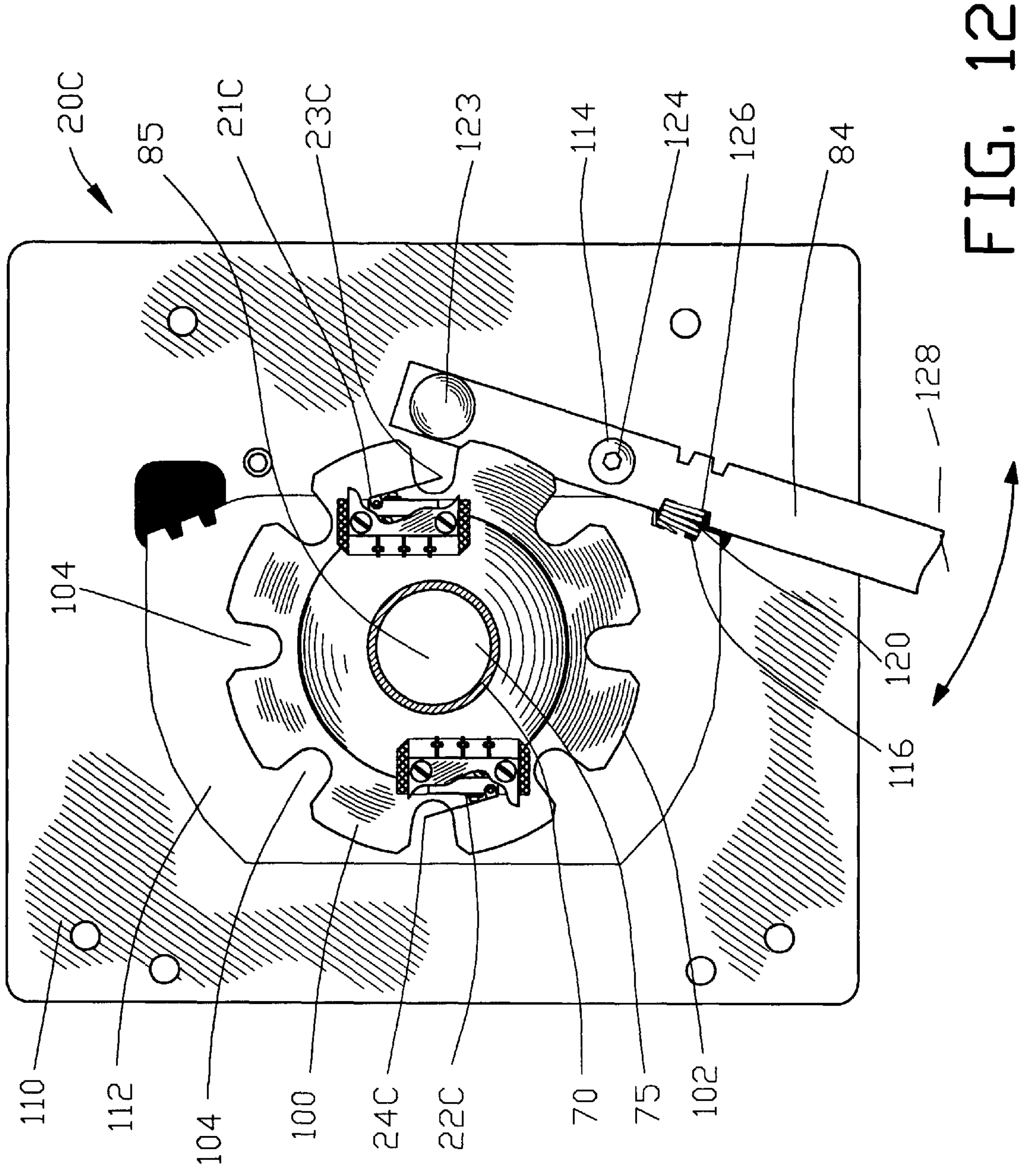
FIG. 12 is a view similar to FIG. 11 illustrating the pivoting of a lever for deactuating a first switch.

FIG. 12 is a view similar to FIG. 11 with the seat assembly 80 being disposed within the first rotational station and with the operating lever 84 being located in an unlocked position for enabling rotation of the seat assembly 80. The operating lever 84 is moved against the urging of spring 120 to move the notch pin 123 out of engagement with the notch 104. Concomitantly therewith, the notch pin 123 is moved out of engagement with the first switch actuator 23C for deactuating the first switch 21C. The second switch 22C is likewise deactuated.

The simultaneous deactuation of the first and second switches 21C and 22C inhibits all electrical operation of the power wheelchair 5. The simultaneous deactuation of the first and second switches 21C and 22C provides a safety feature for inhibiting electrical operation of the power wheelchair 5 when the seat assembly 80 is not locked in either the first rotational station in FIGS. 1 and 9 or the second rotational station shown in FIGS. 2 and 10.

Figure 13:
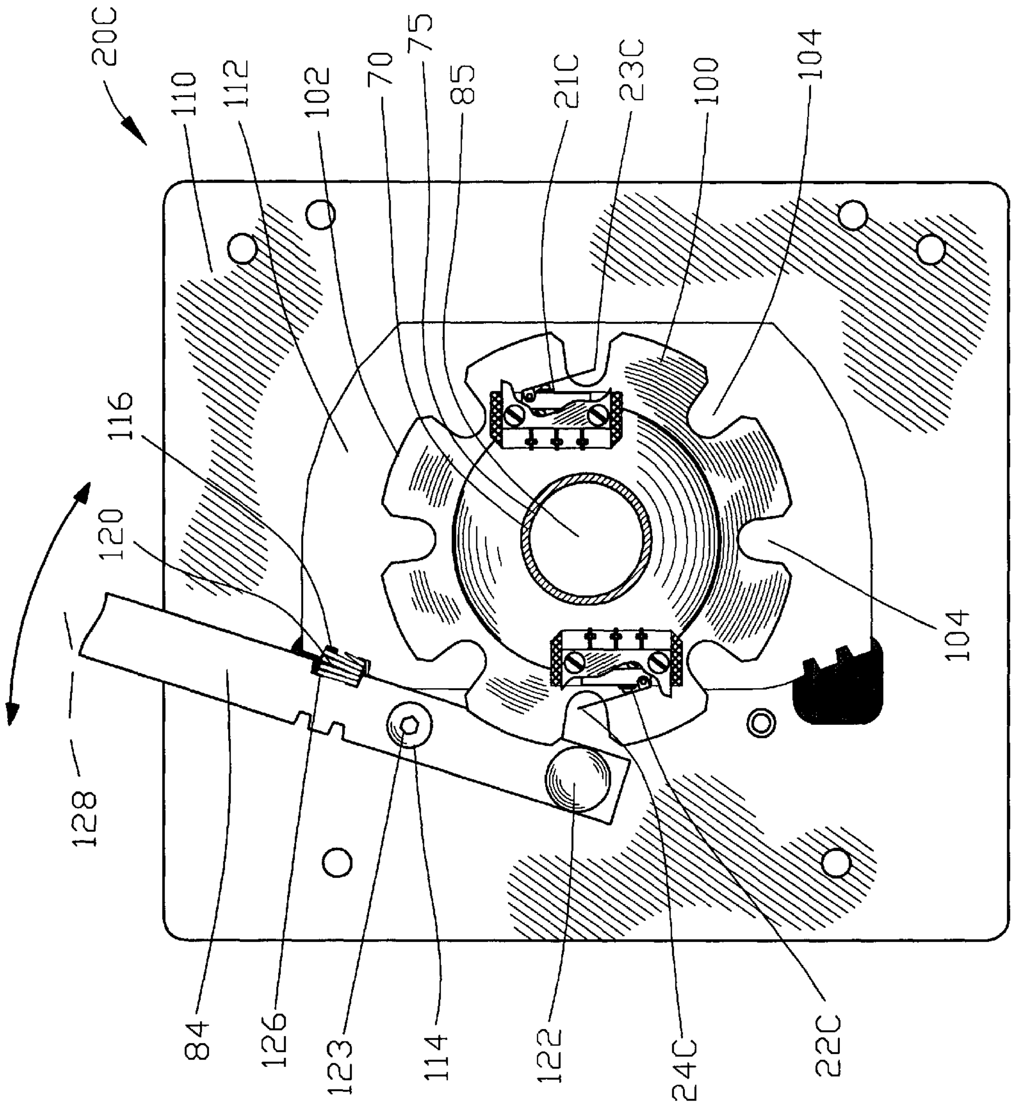
FIG. 13 is a view similar to FIG. 12 illustrating the rotation of the chair.

FIG. 13 is a view similar to FIG. 12 with the seat assembly 30 being disposed within the second rotational position and with the operating lever 84 being located in an unlocked position.

Figure 14:
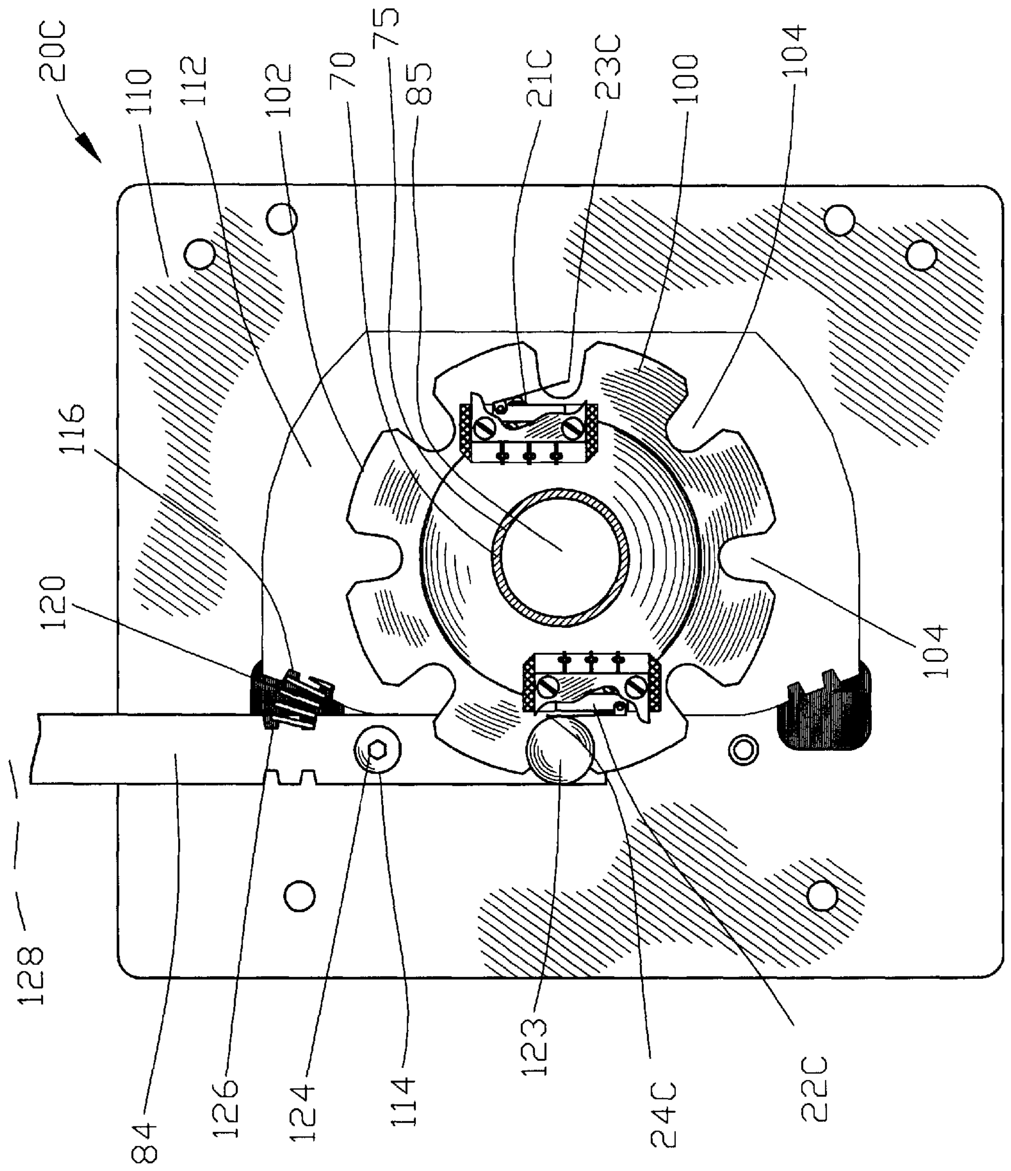
FIG. 14 is a view similar to FIG. 13 illustrating the pivoting of the lever for actuating a second switch.

FIG. 14 is a view similar to FIG. 13 with the seat assembly 80 being disposed within the second rotational position and with the operating lever 84 being located in a locked position for inhibiting rotation of the seat assembly 80. The spring 120 urges the notch pin 123 into engagement with a second switch actuator 24C for actuating the second switch 22C. The actuation of the second switch actuator 24C electrically switches the power wheelchair 5 into the rear wheel drive operation as shown in FIG. 2.

FIGS. 15–18 illustrate the first footrest assembly 11 and the second embodiment of the improved electrical switching device 20F of the present invention. The structure and operation of improved electrical switching device 20F is set forth with reference to the first footrest assembly 11 with the second footrest assembly operating in a similar manner.

Figure 15:
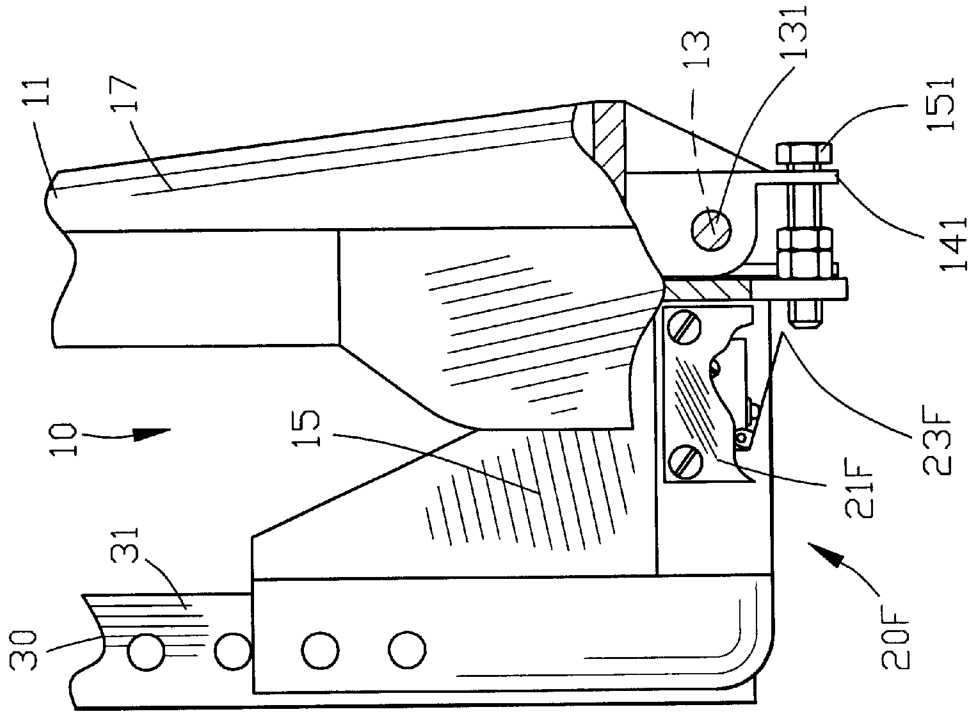
FIG. 15 is an enlarged view along line 15—15 in FIG. 8

FIG. 15 is an enlarged view along line 15—15 in FIG. 8 illustrating the first footrest plate 17 in the inoperative position relative to the personal mobility vehicle 5. A first pivot 131 pivotably mounts the first footrest plate 17 relative to the first footrest base 15. The first spring 13 biases the first footrest plate 17 into the inoperative position. When the first footrest plate 17 is located in the inoperative position, the first footrest plate 17 is disposed in a generally vertical position. A first adjustable stop 151 is provided for adjusting the operative position of the first footrest base 15 as shown in FIG. 16.

A first switch 21F is secured to the first footrest base 15 whereas a first actuator surface 141 is secured to the first footrest plate 17. Preferably, the first footrest base 15 is removably secured to the first end 31 of the frame 30. The second footrest plate 18 is pivotably mounted to the second footrest base 16 in a similar manner.

Figure 16:
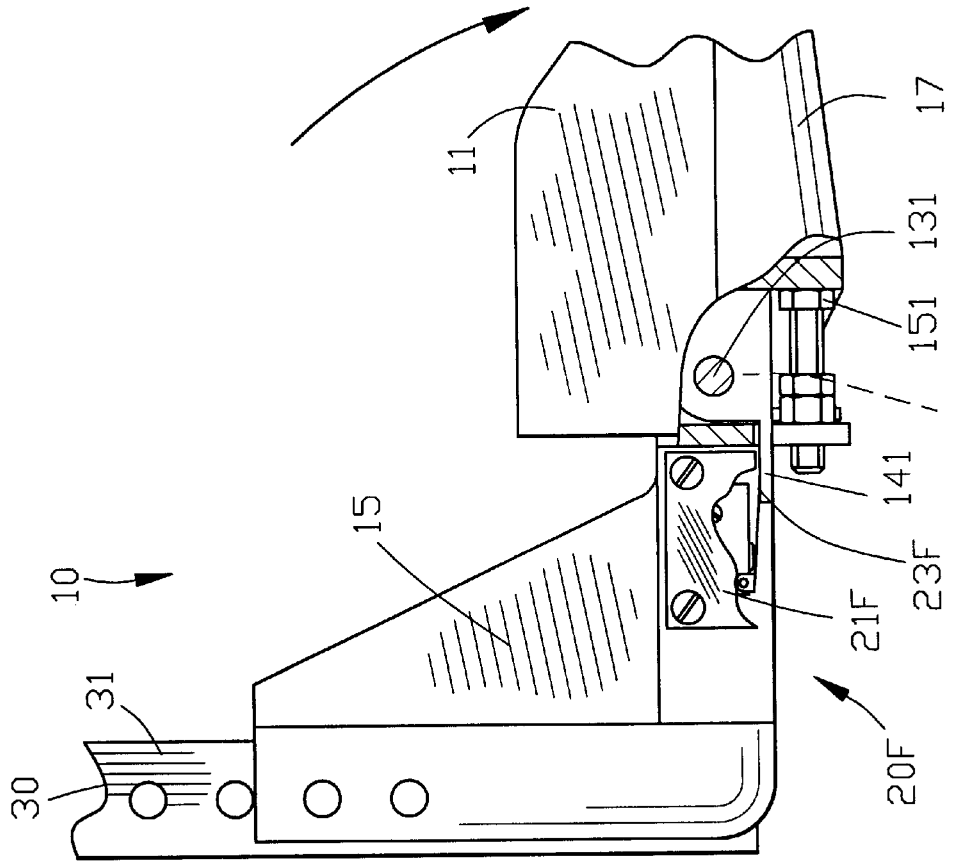
FIG. 16 is an enlarged view along line 16—16 in FIG. 7

FIG. 16 illustrates the power wheelchair 5 with the first footrest plate 17 located in an operative position. The feet 91 of the operator 90 pivots the first footrest plate 17 into the operative position for providing a footrest for the operator 90. When the first footrest plate 17 is located in the operative position, the first footrest plate 17 is disposed in a generally horizontal position as controlled by the first adjustable stop 151. The second footrest plate 18 of the second footrest assembly 12 remains in the inoperative position.

Figure 18:
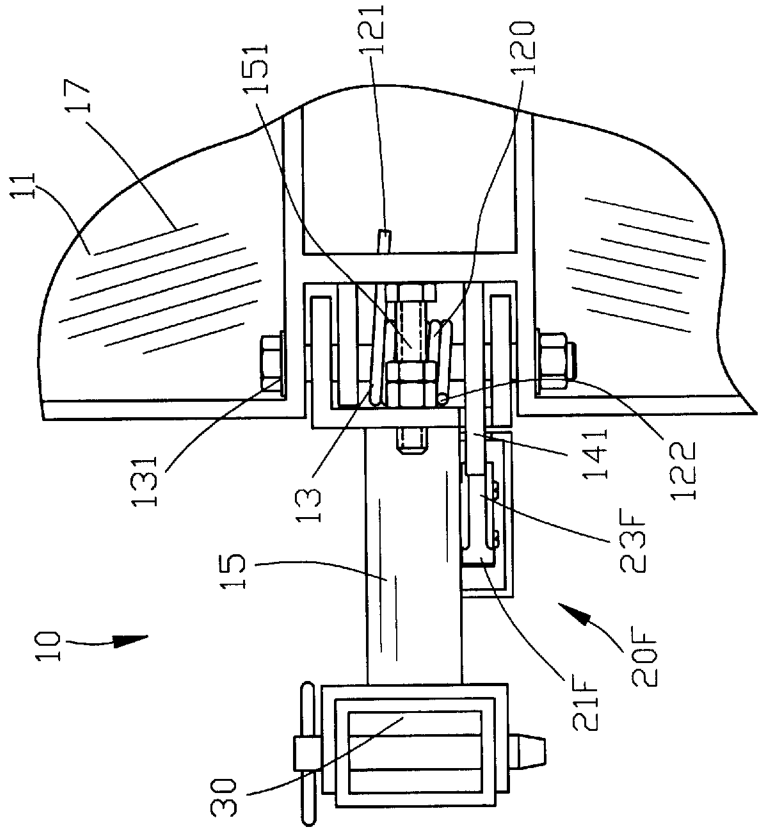
FIG. 18 is a bottom view of FIG. 16.
Figure 17:
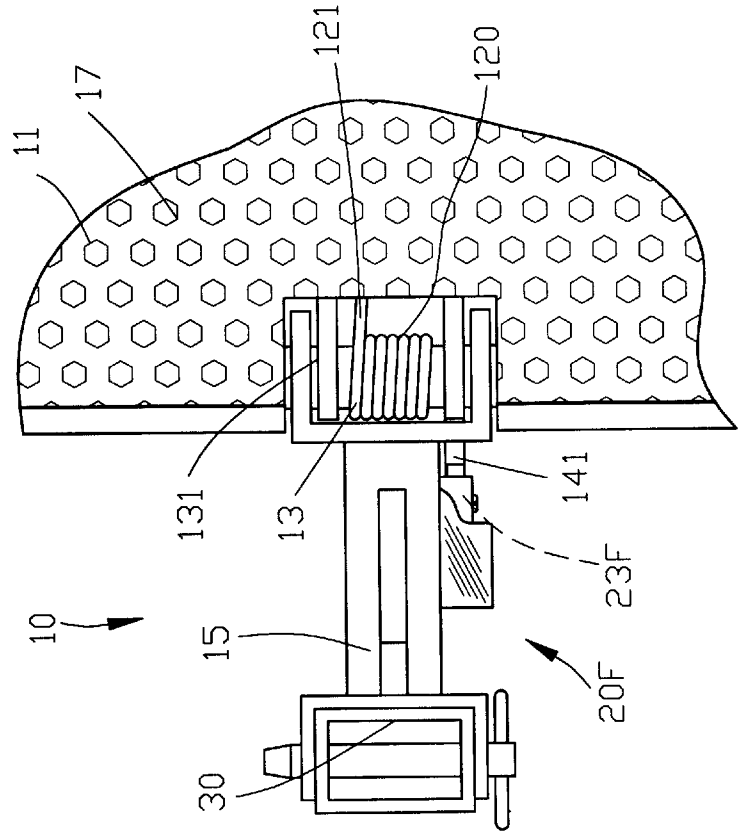
FIG. 17 is a top view of FIG. 16

FIGS. 17 and 18 are top and bottom views of FIG. 16. The first spring 120 is shown as a coil spring having a first and a second end 121 and 122. The coil spring 120 encircles the first pivot 131 with the first end 121 coacting with the first footrest plate 17 and with the second end 122 coacting with the first footrest base 15.

When the first footrest plate 17 is located in the operative position, the first actuator surface 141 of the first footrest plate 17 engages a first actuator 23F for actuating the first switch 21F. The actuation of the first switch actuator 23F electrically switches the power wheelchair 5 into the front wheel drive operation as shown in FIG. 5. The second footrest assembly 12 operates in a similar manner.

Figure 19:
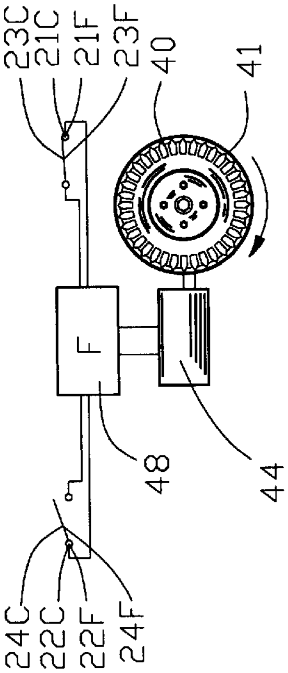
FIG. 19 is an electrical diagram of actuating the first switch for switching the electrical switching device into the front wheel drive operation.

FIG. 19 is an electrical diagram of actuating one of the first switches 21C or 21F for switching the electrical switching device 20 into the front wheel drive operation. Upon the actuation of one of the first switches 21C or 21F, the power wheelchair 5 is switched into the front wheel drive operation.

Figure 20:
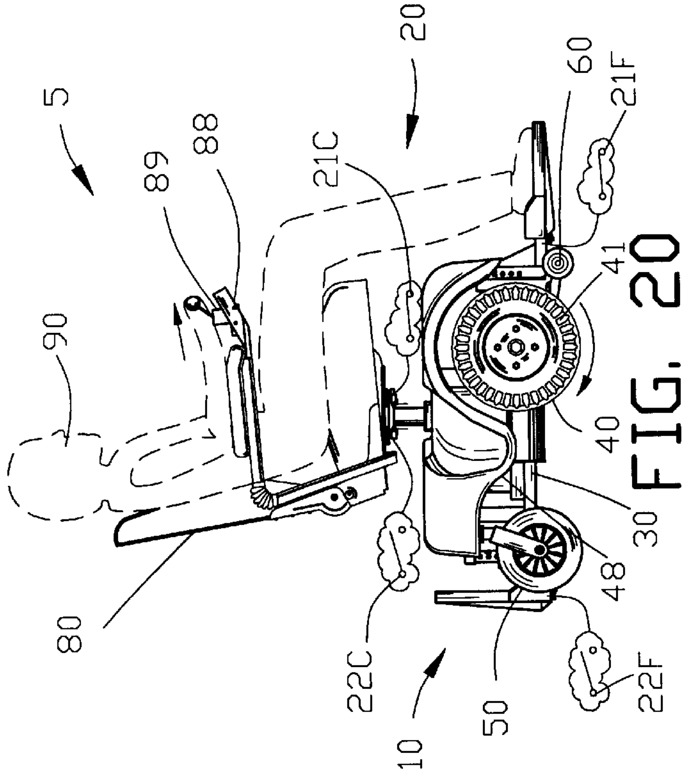
FIG. 20 illustrates the power wheelchair in a front wheel drive operation.

FIG. 20 illustrates the power wheelchair 5 in the front wheel drive operation. In the first embodiment of the electrical switching device 20C, the mechanical orientation of the chair assembly 80 switches the first switch 21C for electrically switching the power wheelchair 5 into the front wheel drive power wheelchair 5 shown in FIG. 20. In the second embodiment of the electrical switching device 20F, the mechanical movement of the first footrest assembly 11 switches the first switch 21F for electrically switching the power wheelchair 5 into the front wheel drive power wheelchair 5 shown in FIG. 20.

Figure 21:
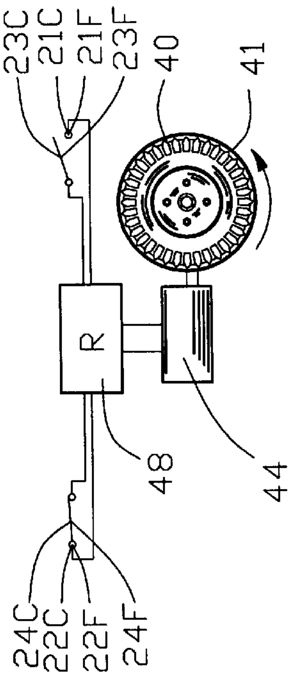
FIG. 21 is an electrical diagram of actuating the second switch for switching the electrical switching device into the rear wheel drive operation.

FIG. 21 is an electrical diagram of actuating one of the second switches 22C or 22F for switching the electrical switching device into the rear wheel drive operation. Upon the actuation of one of the second switches 22C or 22F, the power wheelchair 5 is switched into the rear wheel drive operation.

Figure 22:
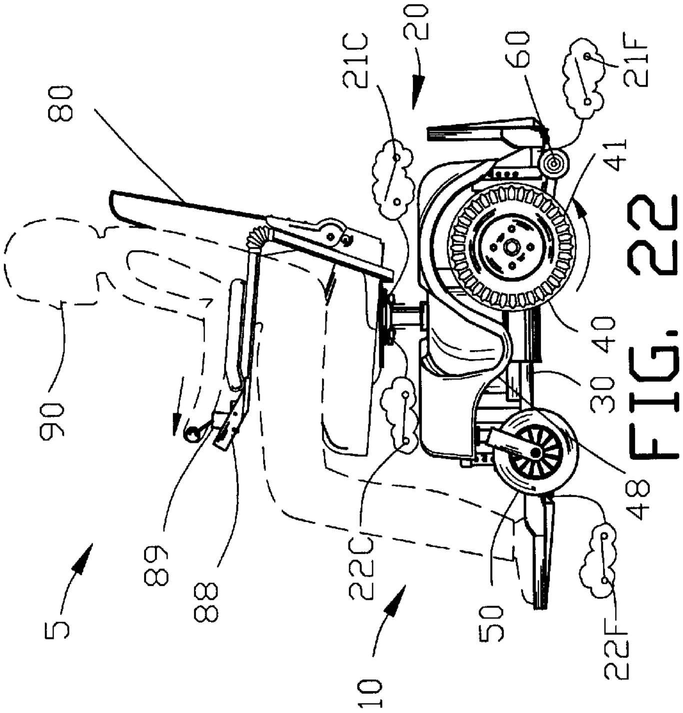
FIG. 22 illustrates the power wheelchair in a rear wheel drive operation. Similar reference characters refer to similar parts throughout the several Figures of the drawings.

FIG. 22 illustrates the power wheelchair 5 in the rear wheel drive operation. In the first embodiment of the electrical switching device 20C, the mechanical orientation of the chair assembly 80 switches the second switch 22C for electrically switching the power wheelchair 5 into the rear wheel drive power wheelchair 5 shown in FIG. 22. In the second embodiment of the electrical switching device 20F, the mechanical movement of the second footrest assembly

12 switches the second switch 22F for electrically switching the power wheelchair 5 into the rear wheel drive power wheelchair 5 shown in FIG. 22.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved electrical switching device for a personal mobility vehicle for switching a power source between a front wheel drive operation and a rear wheel drive operation, comprising:

a frame having a pair of driving wheels mounted to said frame;

a pair of idler wheels mounted to said frame;

a chair rotatably mounted to said frame between a first and a second rotational position;

a first and second switch connected to the power source;

said first switch being actuated when said seat is rotated into a said first rotational position with said drive wheels being in front of the seat for energizing the power source for a front wheel drive operation;

said second switch being actuated when said seat is rotated into said second rotational position with said drive wheels being behind the seat for energizing the power source for a rear wheel drive operation;

said first and second switches inhibit energizing the control power source intermediate said first and second rotational positions to provide a safety feature inhibiting electrical opertion of the personal mobility vehicle during transition between said front wheel drive operation to said rear wheel drive operation.

2. An improved electrical switching device as set forth in claim 1, wherein said first and second switches includes a first and a second microswitch.

3. An improved electrical switching device as set forth in claim 1, wherein said first switch is located 180 degrees from said second switch.

4. An improved electrical switching device as set forth in claim 1, wherein the power source is energized only actuation of one of said first and second switches.

* * * * *